(12) United States Patent
Narasimha et al.

(10) Patent No.: US 7,529,211 B2
(45) Date of Patent: May 5, 2009

(54) METHOD AND APPARATUS FOR MANAGING PAGING RELATED DELAYS

(75) Inventors: Murali Narasimha, Grayslake, IL (US); Kris K. Martinovich, Streamwood, IL (US)

(73) Assignee: Motorola, Inc., Schaumburg, IL (US)

( * ) Notice: Subject to any disclaimer, the term of this patent is extended or adjusted under 35 U.S.C. 154(b) by 305 days.

(21) Appl. No.: 11/098,131

(22) Filed: Apr. 4, 2005

(65) Prior Publication Data

US 2006/0221910 A1  Oct. 5, 2006

(51) Int. Cl.
*H04J 3/00* (2006.01)

(52) U.S. Cl. .................. 370/337; 370/311; 370/329; 370/342; 370/345; 370/366; 455/459; 455/458; 455/515

(58) Field of Classification Search .......... 370/337, 370/311, 329, 342, 345, 347, 366; 455/343.1, 455/450, 458, 466, 515, 561, 574
See application file for complete search history.

(56) References Cited

U.S. PATENT DOCUMENTS

| 6,822,973 | B2 | 11/2004 | Kelley et al. | |
|---|---|---|---|---|
| 6,823,191 | B2 | 11/2004 | Laroia et al. | |
| 2004/0160942 | A1 | 8/2004 | Kelley et al. | |
| 2005/0002345 | A1* | 1/2005 | Pyo et al. | 370/311 |
| 2005/0002351 | A1* | 1/2005 | Kong et al. | 370/328 |
| 2005/0002370 | A1* | 1/2005 | An et al. | 370/345 |
| 2005/0007973 | A1 | 1/2005 | Jang et al. | |
| 2005/0009547 | A1 | 1/2005 | Harris et al. | |
| 2005/0009548 | A1 | 1/2005 | Kelley et al. | |
| 2005/0014519 | A1 | 1/2005 | Sinnarajah et al. | |
| 2005/0036464 | A1* | 2/2005 | Rajkotia et al. | 370/336 |
| 2005/0085253 | A1* | 4/2005 | Mansour | 455/519 |
| 2005/0164705 | A1* | 7/2005 | Rajkotia et al. | 455/436 |
| 2005/0164718 | A1* | 7/2005 | Rajkotia et al. | 455/458 |
| 2005/0164741 | A1* | 7/2005 | Rajkotia et al. | 455/561 |
| 2005/0239449 | A1* | 10/2005 | Timms | 455/418 |
| 2007/0042814 | A1* | 2/2007 | Kakimoto et al. | 455/574 |

OTHER PUBLICATIONS 3G 3rd Generation Partnership Project 2 "3GPP2"; C20-20040920-xxx; TSG-C SWG2.3 "Performance Analysis of Proposed Enhancements to Reduced Slot Cycle Index Mode (ERSC)" Motorola, Inc.; Murali Narasimha, Kris Martinovich; 2004.

(Continued)

*Primary Examiner*—Matthew D Anderson
*Assistant Examiner*—Shaima Q Aminzay
(74) *Attorney, Agent, or Firm*—Lawrence J. Chapa (57) ABSTRACT

A method and apparatus for managing paging related delays between a mobile station and a base station is provided, which includes the use of a fractional slot cycle index. A first value for the slot cycle index, which is equal to an integer value less than a desired fractional slot cycle index value, is selected for use during a period of time corresponding to a determined proportion of a reduced slot cycle period, and a second value for the slot cycle index, which is equal to an integer value greater than a desired fractional slot cycle index value, is selected for use during a period of time corresponding to a remaining portion of the reduced slot cycle period.

21 Claims, 5 Drawing Sheets

OTHER PUBLICATIONS 3G 3rd Generation Partnership Project 2 "3GPP2"; TSG-C SW23; "Samsung: Enhanced Reduced Slot Cycle Mode"; Samsung Electroncs Co., Ltd.; Yuchul Kim, Jungsoo Jung, B. S. Bae, Daegyun Kim, Purva R. Rajkotia; Sep. 2004.

Yuchul Kim, Jungsoo Jung, Beomsik Bae, Daegyun Kim, Purva R. Rajkota, Young Kyun Kim; "Upper Layer Enhancements for Fast Call Setup in CDMA2000 Revison D"; XP-002389228; IEEE Communications Magazine; Apr. 2005; pp. 57-64.

* cited by examiner

METHOD AND APPARATUS FOR MANAGING PAGING RELATED DELAYS

FIELD OF THE INVENTION

The present invention relates generally to the management of paging related delays between a mobile station and a base station in a communication system. More particularly, the present invention relates to the implementation of a fractional slot cycle index as part of a slotted mode of operation including a reduced slot cycle period.

BACKGROUND OF THE INVENTION

In an effort to reduce power consumption and extend battery life, many mobile stations will enter an idle or sleep state for significant portions of time when a mobile station is not in an active call, during which at least portions of the receiver circuitry are effectively deactivated and power usage is correspondingly reduced. During this time, the mobile station will periodically wake up thereby enabling paging channel messages to be received, while the portions of the receiver that are necessary for receiving paging signals are activated. Conversely, paging channel messages can not be received during the periods of time in which the portions of the receiver circuitry, that are necessary for receiving paging channel messages, are not activated. Generally, the anticipated activation periods of the mobile station are known to the base station in order that the transmission of the paging channel messages from the base station can be coordinated with the periods of time during which the portion of the mobile station associated with the receiver circuitry is activated, and correspondingly the mobile station is able to receive the messages. The periodic activation of receiver circuitry for the purpose of receiving paging channel messages, when the mobile station is not in an active call, is sometimes called slotted mode.

Because the related power usage is related to the amount of time during which the corresponding portions of the mobile station are activated, there is an incentive to maximize the amount of time that the corresponding portions of the mobile station are deactivated including maximizing the amount of time between activations. However maximizing the amount of time that the corresponding portions of the mobile station are deactivated including the amount of time between activations can have an adverse effect on the availability of the mobile station for receiving paging messages, where delays in the ability to transmit and receive paging messages can increase the amount of time required to set up a call. Where the delay is significant and/or corresponds to a noticeable amount, the delay can negatively affect a user's overall usage experience. More specifically, a paging delay refers to the duration of time between, when the base station receives a request to page a mobile station, and when the page is actually sent. For applications, such as push-to-talk or web browsing applications, any meaningful delays associated with call set up can be especially noticeable.

For some networks, such as a cellular wireless communication networks, which are implemented in accordance with at least some traditional forms of code division multiple access (CDMA) protocols, a slot cycle index of 1 or 2 is normal. A slot cycle index of 1 or 2 can translate into possible paging delays of up to 2.56 seconds for a slot cycle index value of 1, and paging delays of up to 5.12 seconds for a slot cycle index value of 2. Generally, the maximum possible paging delay corresponds to the length of the slot cycle, which is given by the formula $1.28 \times 2^i$ seconds, where i is the value of the slot cycle index.

In Kelley et al., U.S. Pat. No. 6,822,973, an apparatus and method for operating in reduced slotted mode, which correspondingly reduces the paging delay during the portion of time in which the mobile station and the base station are operating in a reduced slotted mode, is described. In at least some instances, the operation in reduced slotted mode is intended for predetermined periods of time following the release of a traffic channel, where the likelihood of an incoming paging message is thought to be more significant, after which the operation of mobile station and the base station returns to a slotted mode having a slot cycle index value corresponding more closely to normal operation.

During the reduced slotted mode, the slot cycle index can have a negative value, which can reduce the length of the slot cycle to less than 1.28 seconds. For example, a slot cycle index value of −3 results in a slot cycle having a length of 160 ms. Where the maximum paging delay corresponds to the length of the slot cycle, the likelihood of a noticeable paging delay, where the slot cycle index value is negative, is correspondingly reduced. Presumably, during a period of operation corresponding to the reduced slotted mode, the amount of power being consumed within the mobile station receiver is correspondingly increased.

Previous reduced slotted modes are largely associated with slot cycle index values, that have an integer value. The inventors of the present application have recognized that one might be better able to balance the power savings with the potential paging delays associated with a slotted mode of operation, such as reduced slotted mode, if greater granularity in selecting a slot cycle index value was available. Consequently, a method and apparatus for managing paging related delays, which would allow for the use of an effective fractional slot cycle index, as part of a slotted mode of operation including a reduced slot cycle period, would be beneficial.

SUMMARY OF THE INVENTION

The present invention provides for a method of managing paging related delays between a mobile station and a base station. The method includes setting a slot cycle index to a first value, which is equal to an integer value less than a desired fractional slot cycle index value, and operating in slotted mode for receiving paging messages using the first value of the slot cycle index for a determined proportion of a reduced slot cycle period. The slot cycle index is then set to a second value, which is equal to an integer value greater than the desired fractional slot cycle index value, and the slotted mode for receiving paging messages is operated within using the second value of the slot cycle index for a remaining portion of the reduced slot cycle period.

In at least one embodiment, at least one of the first value of the slot cycle index, the second value of the slot cycle index, the determined proportion of the reduced slot cycle period, and the remaining portion of the reduced slot cycle period are determined by the mobile station, based on a desired fractional slot cycle index value received from the base station.

In at least a further embodiment, at least one of the first value of the slot cycle index, the second value of the slot cycle index, the determined proportion of the reduced slot cycle period, and the remaining portion of the reduced slot cycle period are received by the mobile station from the base station.

The present invention further provides a mobile station, which includes a slotted mode receiver for receiving a paging signal, where the slotted mode receiver has a slot cycle index corresponding to the periods during which the receiver is activated and paging signals can be received. The mobile station further includes a controller, which is coupled to the slotted mode receiver, where the controller is adapted for setting the slot cycle index to a first value, which is equal to an integer value less than a desired fractional slot cycle index value during a period of time corresponding to a determined proportion of a reduced slot cycle period, and is adapted for setting the slot cycle index to a second value, which is equal to an integer value greater than a desired fractional slot cycle index value during a period of time corresponding to a remaining portion of the reduced slot cycle period.

In at least one embodiment, the mobile station is a cellular radio telephone.

The present invention still further provides a base station, which includes a transmitter for transmitting a paging signal, and a controller including a scheduler, which is adapted for scheduling the transmission of a paging signal in a paging slot, responsive to a fractional slot cycle index value and any paging signal offset value associated with an intended mobile station recipient. The fractional slot cycle index includes a slot cycle index having a first integer value, which is less than the fractional slot cycle index value, during a period of time corresponding to a determined proportion of a reduced slot cycle period, and a second integer value, which is greater than the fractional slot cycle index value, during a period of time corresponding to a remaining portion of the reduced slot cycle period.

These and other features, and advantages of this invention are evident from the following description of one or more preferred embodiments of this invention, with reference to the accompanying drawings.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein, however, it is to be understood that the disclosed embodiments are merely exemplary of the invention, which can be embodied in various forms. Therefore, specific structural and functional details disclosed herein are not to be interpreted as limiting, but merely serve as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

Figure 1:
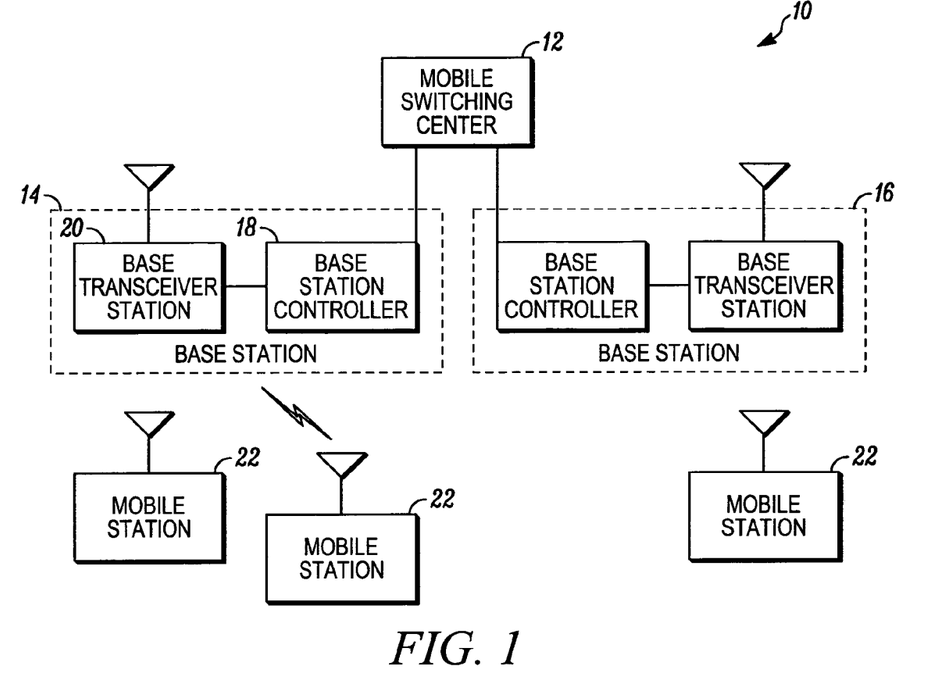
FIG. 1 is a block diagram of an exemplary communication system illustrating an environment within which at least one embodiment of the present invention can operate.

FIG. 1 is a block diagram of an exemplary communication system 10 illustrating an environment within which at least one embodiment of the present invention can operate. The communication system includes a mobile switching center 12, which is generally adapted for performing the telephony switching functions, for example, in a CDMA cellular wireless communication network. In addition and/or as part of performing the telephony switching functions, the mobile switching center will serve as a network interface to other networks, such as a circuit switched landline network, as well as provide some common channel signaling. Typically, the mobile switching center will be coupled to multiple base stations, which are sometimes alternatively referred to as base station subsystems. In the illustrated embodiment, the mobile switching center 12 is illustrated as being coupled to at least a pair of base stations 14 and 16.

Each base station 14 and 16, generally includes a base station controller 18 and a base transceiver station 20. A single base station controller 18 can often be associated with multiple base station transceivers 20, where each base station transceiver 20 is generally associated with a corresponding portion of the geographic coverage area typically referred to as a cell. The base station controller 18, will largely be responsible for managing the nature of the signals communicated between the network infrastructure and the mobile stations 22, including provide for handover functionality, as well as manage the RF power signaling levels. The base transceiver station 20 will largely serve as the over the air or radio interface between the network infrastructure and the mobile stations 22, which are operating in the area corresponding to a particular cell.

When a mobile station is located within a cellular coverage area and is not actively engaged in a call, the mobile station will periodically monitor predetermined paging channels for paging signals indicative of an incoming call. By limiting the signal reception periods, when the mobile station 22 is not actively engaged in a call, portions of the mobile station 22 can be deactivated between periodic activations, thereby conserving power, and extending battery life between battery charges. However such an arrangement, requires that the base station 14 and 16 coordinate any paging signals, so as to be transmitted during time periods, when the receive circuitry of the intended recipient is active and monitoring the paging channels.

Depending upon when the base station receives a paging message to be sent, and the time that the intended recipient will next monitor the paging channel, the paging message may be delayed up to a period of time corresponding to the duration of the slot cycle. As noted previously, the duration of the slot cycle during normal operation will typically vary between 2.56 seconds to 5.12 seconds. Operating in a reduced slot cycle period will generally reduce the duration of the slot cycle during the reduced slot cycle period, but correspondingly will require more frequent activations of the receiver circuitry in the mobile station 22. Traditionally, only slot cycle indexes having integer values have been supported.

The present invention implements a fractional slot cycle index value by subdividing a cycle period into at least a pair of sub-periods, the at least pair of sub-periods including a first sub-period corresponding to a determined proportion of the cycle period, and a second sub-period, which generally includes the remaining portion of the cycle period. During the first sub-period, the slot cycle index is set to a first value, which is equal to an integer value less than the desired fractional slot cycle index value. During the second sub-period, the slot cycle index is set to a second value, which is equal to an integer value greater than the desired fractional slot cycle index value. In at least some embodiments, the first value is the nearest integer value less than the desired fractional slot cycle index value, and the second value is the nearest integer value greater than the desired fractional slot cycle index value. In at least one embodiment, the sub-divided cycle period corresponds to a reduced slot cycle period, which has generally been defined to occur for a predetermined period of time after a preceding call has been released.

Figure 2:
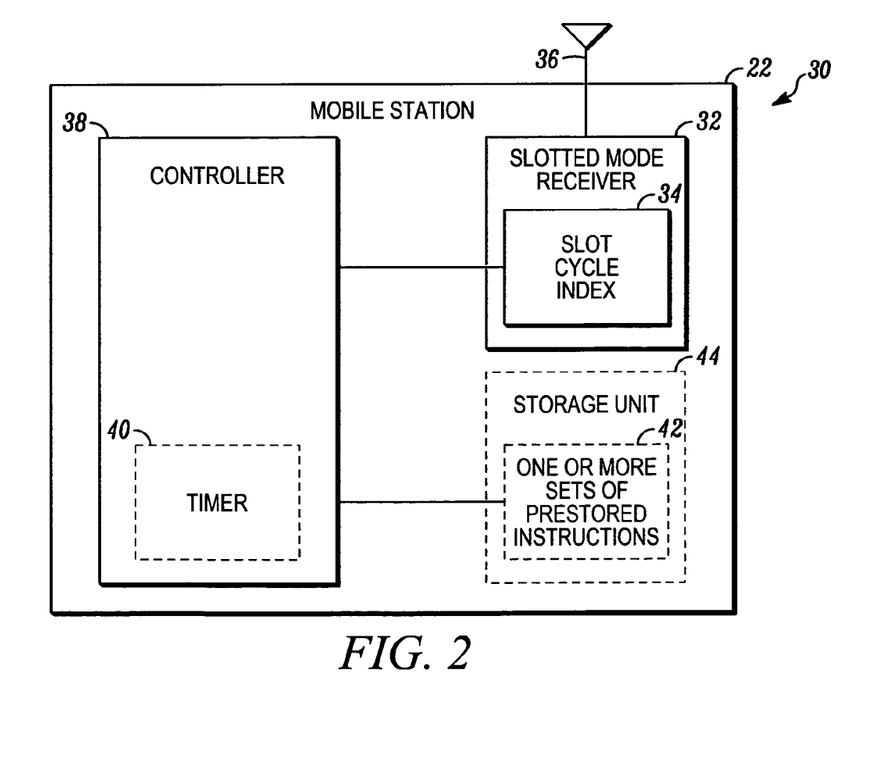
FIG. 2 is a more detailed block diagram of a mobile station, in accordance with at least one embodiment of the present invention.

FIG. 2 illustrates a more detailed block diagram 30 of a mobile station 22, in accordance with at least one embodiment of the present invention. The mobile station includes a receiver 32, which is adapted for operating in slotted mode. The slotted mode receiver 32 has a slot cycle index 34, which corresponds to the periods of time during which the receiver 32 is activated and paging signals can be received, and the frequency that they occur. The receiver 32 is coupled to an antenna 36, which facilitates the reception and/or transmission of radiated energy. The mobile station 22 further includes a controller 38, which is coupled to the slotted mode receiver 32. The controller is adapted for setting the slot cycle index to a first value, which is equal to an integer value less than a desired fractional slot cycle index value during a period of time corresponding to a determined proportion of a reduced slot cycle period, and is adapted for setting the slot cycle index to a second value, which is equal to an integer value greater than a desired fractional slot cycle index value during a period of time corresponding to a remaining portion of the reduced slot cycle period.

In at least some embodiments, the controller includes a timer 40, which can be used to monitor the duration of each of the determined proportion of the reduced slot cycle period and the remaining portion of the reduced slot cycle period, as well as monitor other lengths of time. In some of the embodiments the controller includes one or more sets of prestored instructions 42 for facilitating the operation of the controller including the management of the execution of a slotted receiving mode in accordance with a fractional slot cycle index.

The one or more sets of prestored instructions 42 can be executed by one or more microprocessors, which form all or parts of the controller 38. The one or more sets of prestored instructions 42 can be maintained in a storage unit 44, which can be separate from or integrated as part of the controller 38, and correspondingly any microprocessor, which might form all or part of the controller 38. Still further, the one or more sets of prestored instructions 42 can incorporate programming or software instructions and/or microcode. In the same and/or other embodiments, all or parts of the controller 38 can be alternatively and/or partially implemented in hardware using discrete or integrated circuit elements, including logic gates and/or sequential state machines. However, one skilled in the art will readily appreciate that still further approaches are possible for implementing the same without departing from the teachings of the present invention.

The storage unit 44 can include both volatile and non-volatile forms of memory, many types of which are well known to one skilled in the art. One such example includes a semiconductor memory, for example a read only memory. Other examples include a fixed drive or hard drive, which commonly stores information magnetically. However any form of data storage may be suitable, as long as it supports the ability to at least initially store, and later retrieve the information contained therein.

Additionally and/or alternatively, the receiver 32 could be implemented as part of a transceiver.

In at least one embodiment, the mobile station 22 is a cellular radio telephone. While in at least one instance the mobile station 22 will take the form of a cellular radio telephone, in other instances, the mobile station 22 can take alternative forms, such as a personal or portable laptop computer, a selective call receiver, a pager, a cordless telephone, an audio player, a personal digital assistant, or the like, to the extent that they might communicate with a base station, using a slotted mode receiver. One skilled in the art will readily appreciate that the present invention is equally applicable to other types of devices, which are capable of communicating with a base station 14 and 16, without departing from the teachings of the present invention.

Figure 3:
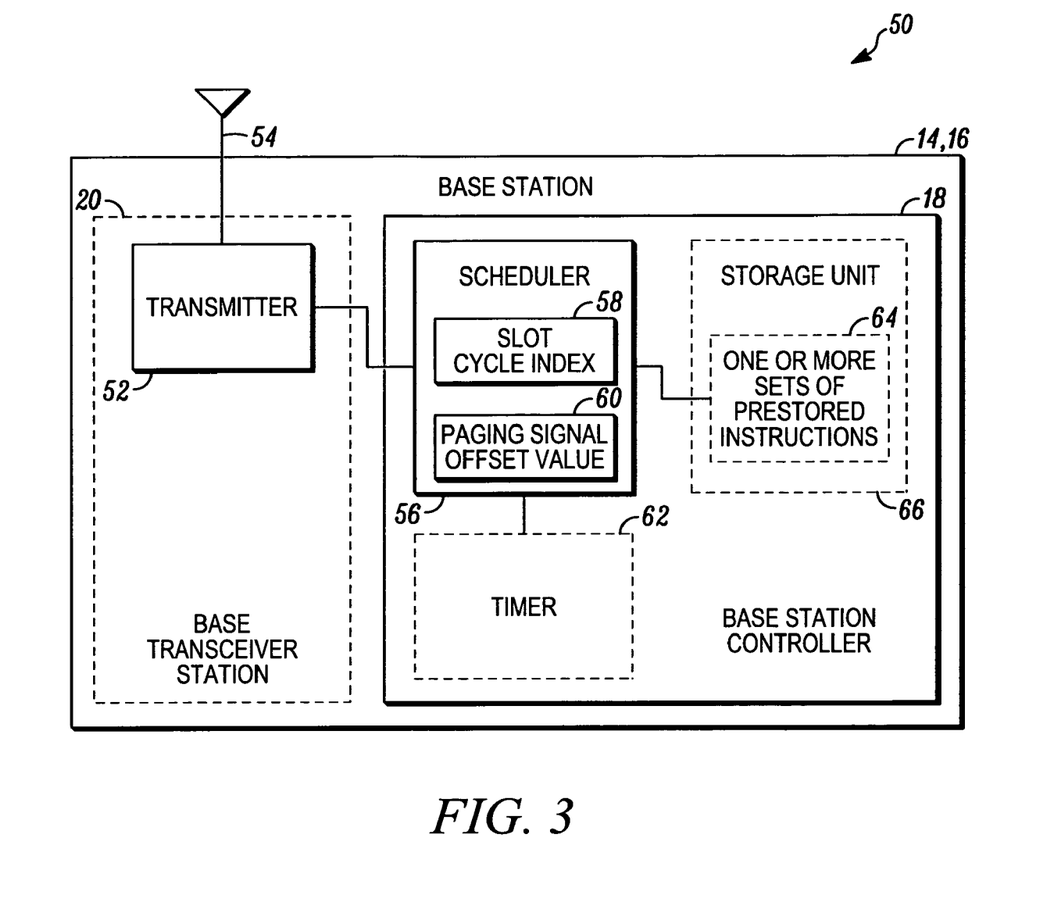
FIG. 3 is a more detailed block diagram of a base station, in accordance with at least one embodiment of the present invention.

FIG. 3 illustrates a more detailed block diagram 50 of a base station 14 and 16, in accordance with at least one embodiment of the present invention. Generally, the base station includes a transmitter 52, coupled to an antenna 54, which is capable of transmitting a paging signal. Similar to the receiver 32 described in connection with the mobile station 22 illustrated in FIG. 2, the transmitter 52 can be implemented as part of a transceiver, such as a base transceiver station 20. The antenna 54 associated with the base station 14, 16, like the antenna 36 associated with the mobile station 22, facilitates the transmission and/or reception of radiated energy.

The transmitter 52 is further coupled to a base station controller 18, which includes a scheduler 56 that is adapted for scheduling the transmission of a paging signal in a paging slot. The scheduler 56 is responsive to a fractional slot cycle index value, and includes a slot cycle index 58 having a first integer value, that is less than the fractional slot index value during a period of time corresponding to a determined proportion of a reduced slot cycle period, and a second integer value, that is greater than the fractional slot cycle index value, during a period of time corresponding to a remaining portion of the reduced slot cycle period.

In at least the illustrated embodiment, the scheduler 56 additionally includes a paging signal offset value 60, which corresponds to a particular offset value associated with the mobile station, that is the intended recipient of the paging signal. The offset value 60 assists the scheduler 56 in determining which portion of the slot cycle period that the receiver 32 of the mobile station 22 will be activated and will be correspondingly able to receive a paging message.

Similar to the controller 38 of the mobile station 22, the base station controller 18 can include a timer 62 for use in determining when different time periods have transpired, which can be coupled to the scheduler 56 for use in implementing a fractional slot cycle index. Additionally, the scheduler 56 can be implemented at least in part with one or more sets of prestored instructions 64 for execution by one or more microprocessors forming all or parts of the base station controller 18. Still further the one or more sets of prestored instructions can be stored and maintained in a storage unit 66.

In connection with implementing the fractional slot cycle index value, the same can originate in either the mobile station or the base station, and be communicated to the other. In at least one embodiment, the mobile station 22 receives the slot cycle index value, and/or one or more corresponding parameters for implementing the same, from the base station 14, 16. In some instances, one or more of the corresponding parameters may be determined locally, i.e. in each of the base station 14, 16 and the mobile 22. In some instances, one or more of the parameters may be transmitted in place of and/or in addition to the desired fractional slot cycle index value. Examples of corresponding parameters include the first integer value of the slot cycle index, the second integer value of the slot cycle index, the determined proportion of the slot cycle period, and the remaining portion of the slot cycle period.

Figure 4A:
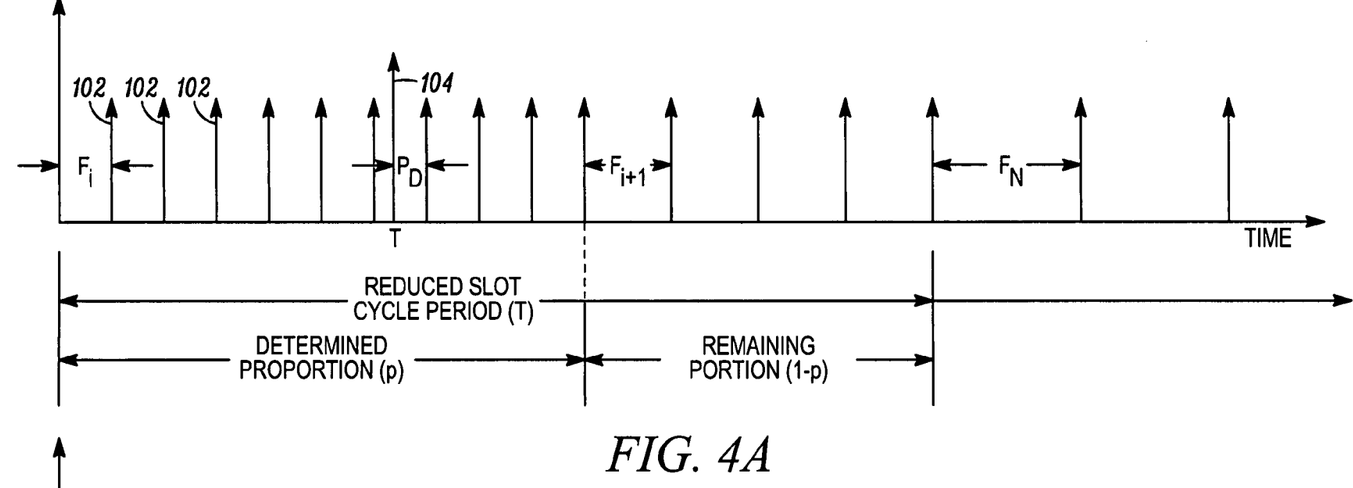
FIGS. 4A-4C are exemplary timing diagrams illustrating the periods of activations associated with different slot cycle indexes during and after a reduced slot cycle period, including the transition from a first slot cycle index value to a second slot cycle index value during the reduced slot cycle period, in accordance with respective ones of multiple different embodiments of the present invention.
Figure 4B:
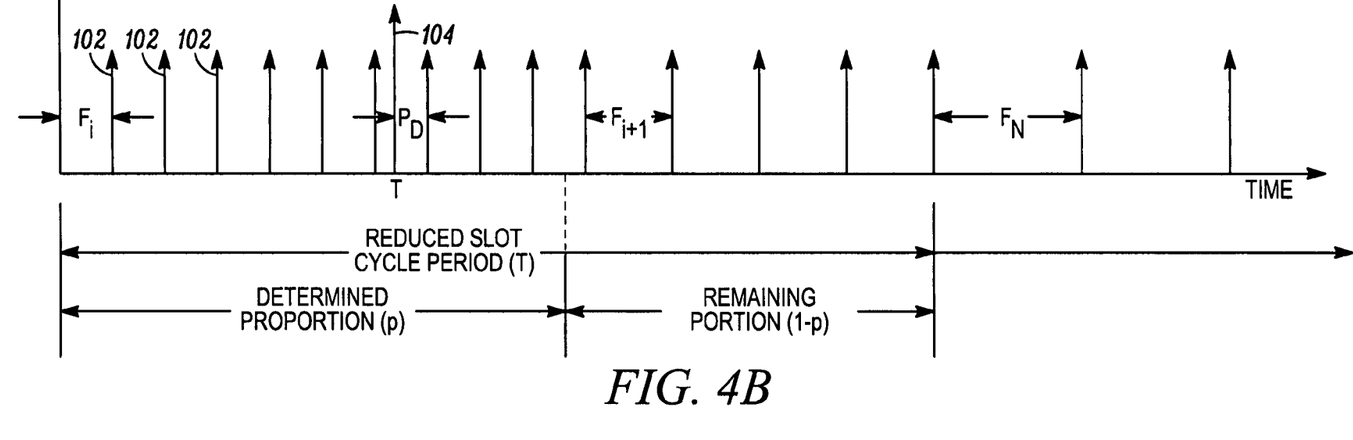
Figure 4C:
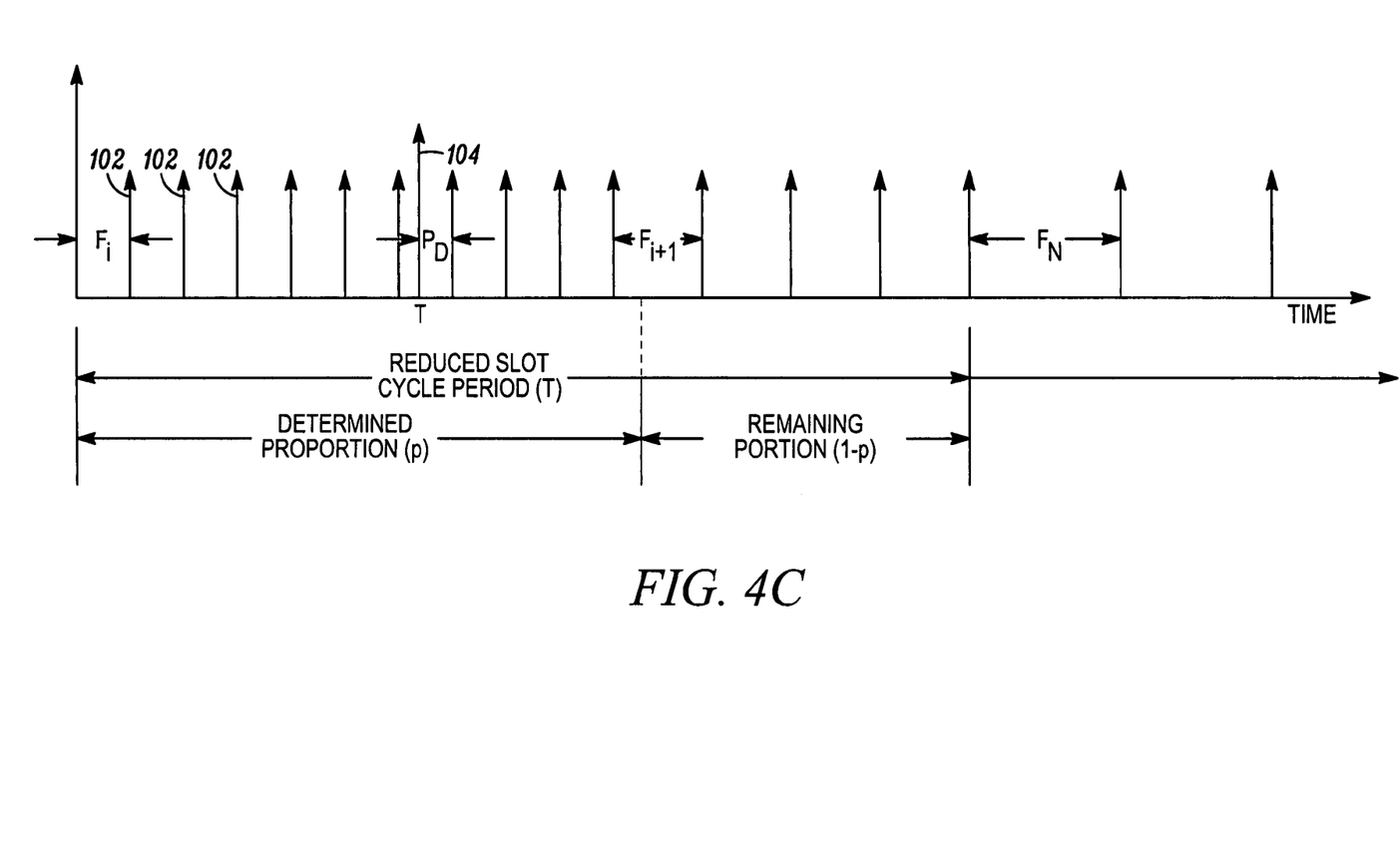

FIGS. 4A-4C are exemplary timing diagram illustrating the periods of activations associated with different slot cycle indexes during and after a reduced slot cycle period, including the transition from a first slot cycle index value to a second slot cycle index value during the reduced slot cycle period, in accordance with respective ones of multiple different embodiments of the present invention.

More specifically, FIG. 4A illustrates an exemplary timing diagram, where the transition from the first slot cycle index value to the second slot cycle index value occurs at the end of the determined proportion of a reduced slot cycle period independent of the next scheduled activation in accordance with the first slot cycle index value. The variable $f_i$ corresponds to the duration of a slot cycle using an integer slot cycle index value that is less than the desired fractional slot cycle index value. In at least one embodiment, the integer slot cycle index value will be the nearest integer value less then the desired fractional slot cycle index value. The variable $f_{i+1}$ corresponds to the duration of a slot cycle using an integer slot cycle index value that is greater than the desired fractional slot cycle index value, where in at least one embodiment, the integer slot cycle index value will be the nearest integer value greater then the desired fractional slot cycle index value. The variable $f_N$ corresponds to the duration of a slot cycle using an integer slot cycle index value that would normally be used, separate from any reduced slot cycle period. The variable PD illustrates an exemplary paging delay, where a paging message request occurs between two periods of activation in accordance with the current slot cycle index. Arrows 102 correspond to the activation of the slotted mode receiver, and arrow 104 corresponds to an exemplary point in time in which a paging message request is received by the scheduler 56 at a time (t).

FIG. 4B illustrates an exemplary timing diagram, where the transition from the first slot cycle index value to the second slot cycle index value occurs at the next periodic activation in accordance with the first value of the slot cycle index after the expiration of the time period corresponding to the determined proportion of the sub-divided slot cycle period.

FIG. 4C illustrates an exemplary timing diagram, where the transition from the first slot cycle index value to the second slot cycle index value occurs from the last periodic activation in accordance with the first value of the slot cycle index before the expiration of the time period corresponding to the determined proportion of the sub-divided slot cycle period.

One could use the ability to select fractional slot cycle index values to more closely manage anticipated paging delays, such as anticipated average paging delays, by appropriately selecting the two different integer slot cycle index values and the corresponding proportion that each slot cycle index value is applied.

For example one might want to design a system where the average paging delay is no more than 500 ms for a system operating in reduced slot cycle mode for 30 seconds after a call is released.

Assuming a Poisson process for call arrivals, there is an exponential distribution for inter-call arrival times, where $P\{t_{n+1}-t_n\ t\}=1-e^{-\lambda t}$; which results in a probability density function of $p(t)=\lambda e^{-\lambda t}$, where t is the exemplary point in time 104 in which a paging message request is received, relative to the preceding call having been released.

For a fractional slot cycle index value r, i is the nearest integer value less than the fractional slot cycle index value r, and i+1 is the nearest integer value greater than the fractional slot cycle index value r. In essence i<r<i+1. Based upon an effective slot cycle length corresponding to $1.28 \times 2^r$ seconds, the determined proportion that the slotted mode receiver should operate using the first slot cycle index value relative to a second slot cycle index value is determined using the following equation.

$$1.28 \times 2^r = T/((pT/1.28 \times 2^i)+((1-p)T/1.28 \times 2^{i+1}))$$

Hence, $$r=\log_2(2^{i+1}/(p+1));\ or\ p=2^{i+1-r}-1$$

Determining a paging delay for each of the three different time periods and integrating over time the same period including the periods corresponding to the sub-divided reduced slot cycle period (fractional) and the remaining operation at a normal slot cycle index after the end of the reduced slot cycle period produces the following equation, relative to an estimated average paging delay.

Estimated Average Paging Delay PD(t) is equal to:

$$E\{PD(t)_{FSCI=r, SCI=N}\} = \int_0^{pT}\left(\left\lceil\frac{t}{f_i}\right\rceil \times f_i - t\right)\times \lambda e^{-\lambda t}\,dt +$$
$$\int_{pT}^{T}\left(pT+\left\lceil\frac{t-pT}{f_{i+1}}\right\rceil \times f_{i+1} - t\right)\times \lambda e^{-\lambda t}\,dt +$$
$$\int_{T}^{\infty}\left(T+\left\lceil\frac{t-T}{f_N}\right\rceil \times f_N - t\right)\times \lambda e^{-\lambda t}\,dt$$

where the fractional slot cycle index (FSCI) during the reduced slot cycle period is r, and the slot cycle index (SCI) after the end of the reduced slot cycle period is N.

Where $\lambda=0.1$ and T=30 seconds, we could iteratively determine the parameter values necessary for an estimated average paging delay of approximately 500 ms. For example, the value p=0.3 has an average paging delay of 492 ms. The value p=0.2 has an average paging delay of 541 ms. The value p=0.28 has an average paging delay of 500 ms. Using p=0.28 and solving for the corresponding fractional slot cycle index value (r) as provided above, a determined proportion (p=0.28) has a fractional slot cycle index value (r=−0.36).

This would translate into a slot cycle index having a first value of −1 for 8.4 seconds (30×0.28), and a slot cycle index having a second value of zero(0) for 21.6 seconds (30×(1−0.28)), which represents a power savings relative to operating for the full 30 second period, corresponding to the reduced slot cycle period, using a slot cycle index of −1, which would otherwise have been necessary to meet or exceed the desired 500 ms average paging delay, if only a single integer slot cycle index value was available.

One could use a similar approach to design for a desired percentage of calls which would have an expected paging delay less than a particular predetermined value. For example, relative to a particular system, it may be desirable for 90 percent of the paging delays to be less than a particular predetermined time value. The slot cycle indexing approach allowing for multiple integer slot cycle index values could be used to design such a system.

Figure 5:
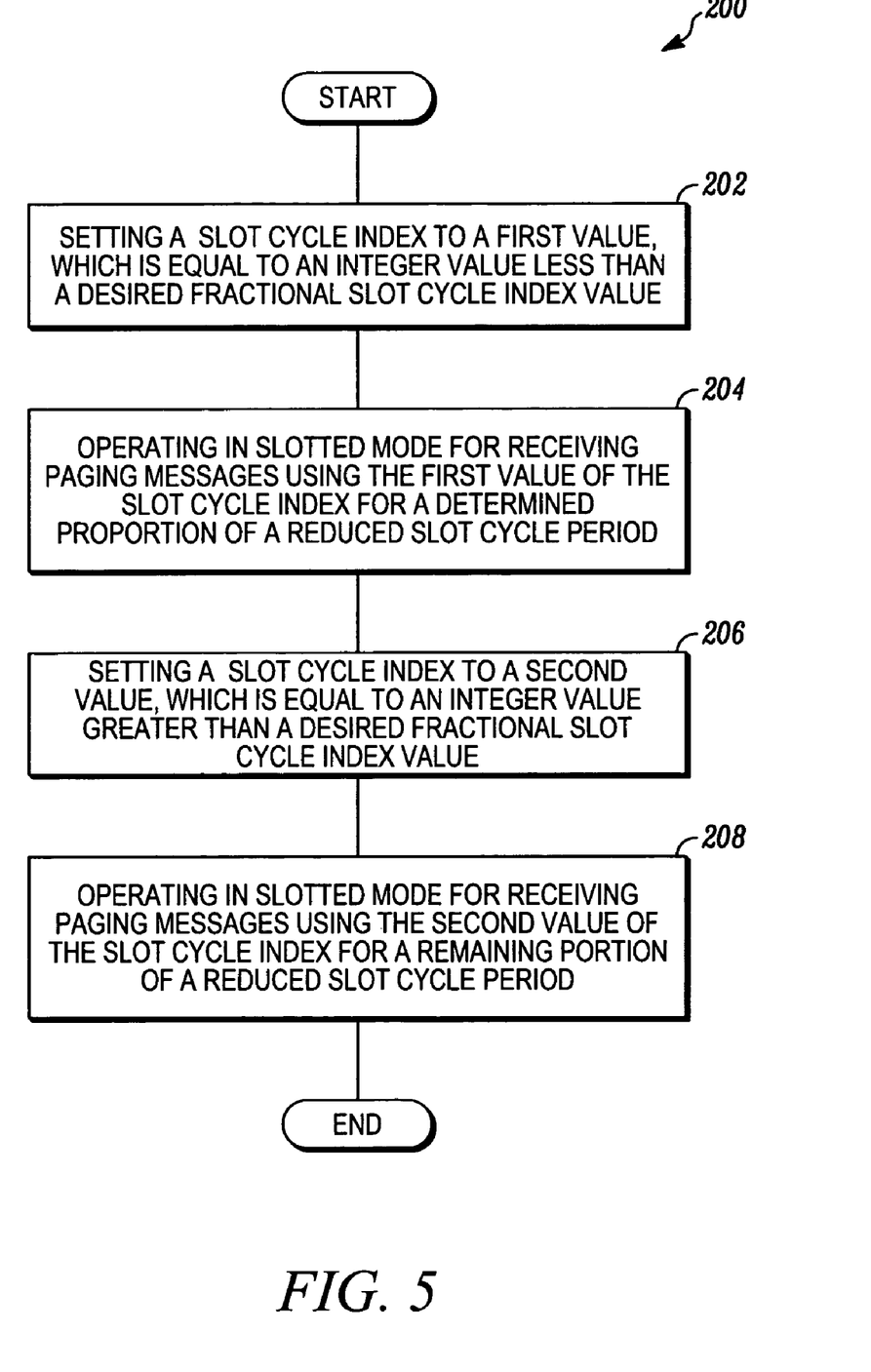
FIG. 5 is a flow diagram of a method of managing paging related delays between a mobile station and a base station, including the use of a fractional slot cycle index, in accordance with at least one embodiment of the present invention.

FIG. 5 illustrates a flow diagram 200 of a method of managing paging related delays between a mobile station and a base station. The method includes setting 202 a slot cycle index to a first value, which is equal to an integer value less than a desired fractional slot cycle index value, and operating 204 in slotted mode for receiving paging messages using the first value of the slot cycle index for a determined proportion of a reduced slot cycle period. The slot cycle index is then set 206 to a second value, which is equal to an integer value greater than the desired fractional slot cycle index value, the slotted mode for receiving paging messages is operated 208 within using the second value of the slot cycle index for a remaining portion of the reduced slot cycle period.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method of managing paging related delays between a mobile station and a base station, said method comprising:
   setting a slot cycle index to a first value, which is equal to an integer value less than a desired non-integer fractional slot cycle index value;
   operating in slotted mode for receiving paging messages using the first value of the slot cycle index for a determined proportion of a reduced slot cycle period;
   setting a slot cycle index to a second value, which is equal to an integer value greater than the desired non-integer fractional slot cycle index value; and
   operating in slotted mode for receiving paging messages using the second value of the slot cycle index for a remaining portion of the reduced slot cycle period.

2. A method in accordance with claim 1, wherein the desired non-integer fractional slot cycle index value is received by the mobile station from the base station.

3. A method in accordance with claim 2, wherein at least one of the first value of the slot cycle index, the second value of the slot cycle index, the determined proportion of the reduced slot cycle period, and the remaining portion of the reduced slot cycle period are determined by the mobile station, based on the received desired non-integer fractional slot cycle index value.

4. A method in accordance with claim 1, wherein at least one of the first value of the slot cycle index, the second value of the slot cycle index, the determined proportion of the reduced slot cycle period, and the remaining portion of the reduced slot cycle period are received by the mobile station from the base station.

5. A method in accordance with claim 1, wherein the first value is the nearest integer value less than the desired non-integer fractional slot cycle index value.

6. A method in accordance with claim 1, wherein the second value is the nearest integer value greater than the desired non-integer fractional slot cycle index value.

7. A method in accordance with claim 1, wherein the determined proportion of the reduced slot cycle period has a value, which is determined to provide a selected average paging delay.

8. A method in accordance with claim 1, wherein the determined proportion of the reduced slot cycle period has a value, which is determined to provide a paging delay less than or equal to a target paging delay for a predetermined percentage of calls.

9. A method in accordance with claim 1, wherein operating in slotted mode for receiving paging messages includes periodically activating a receiver thereby enabling the receipt of a paging signal, wherein the duration between successive periodic activations corresponds to the current value of the slot cycle index.

10. A method in accordance with claim 9, wherein the periodic activation of the receiver during the remaining portion of the reduced slot cycle is initiated at the end of a time period corresponding to a duration of the determined proportion of the reduced slot cycle period.

11. A method in accordance with claim 9, wherein the periodic activation of the receiver during the remaining portion of the reduced slot cycle is initiated from a last periodic activation in accordance with the first value of the slot cycle index before the expiration of a time period corresponding to a duration of the determined proportion of the reduced slot cycle period.

12. A method in accordance with claim 9, wherein the periodic activation of the receiver during the remaining portion of the reduced slot cycle is initiated from a next scheduled periodic activation in accordance with the first value of the slot cycle index after the expiration of a time period corresponding to a duration of the determined proportion of the reduced slot cycle period.

13. A mobile station comprising:
   a slotted mode receiver for receiving a paging signal, the slotted mode receiver having a slot cycle index corresponding to the periods during which the receiver is activated and paging signals can be received; and
   a controller, coupled to the slotted mode receiver, wherein the controller is adapted for setting the slot cycle index to a first value, which is equal to an integer value less than a desired non-integer fractional slot cycle index value during a period of time corresponding to a determined proportion of a reduced slot cycle period, and is adapted for setting the slot cycle index to a second value, which is equal to an integer value greater than the desired non-integer fractional slot cycle index value during a period of time corresponding to a remaining portion of the reduced slot cycle period.

14. A mobile station in accordance with claim 13, wherein the controller includes one or more sets of prestored instructions for setting the slot cycle index to a first value, which is equal to an integer value less than a desired non-integer fractional slot cycle index value during a period of time corresponding to a determined proportion of a reduced slot cycle period, and for setting the slot cycle index to a second value, which is equal to an integer value greater than a desired non-integer fractional slot cycle index value during a period of time corresponding to a remaining portion of a reduced slot cycle period.

15. A mobile station in accordance with claim 13, wherein said controller is further adapted for determining at least one of the first value of the slot cycle index, the second value of the slot cycle index, the determined portion of the reduced slot cycle period, and the remaining portion of the reduced slot cycle period, based on a desired non-integer fractional slot cycle index value.

16. A mobile station in accordance with claim 15, wherein the controller includes one or more sets of prestored instructions for determining at least one of the first value of the slot cycle index, the second value of the slot cycle index, the determined portion of the reduced slot cycle period, and the remaining portion of the reduced slot cycle period, based on a desired non-integer fractional slot cycle index value.

17. A mobile station in accordance with claim 13, wherein said controller includes a timer for identifying an elapsed time corresponding to the determined proportion of the reduced slot cycle period.

18. A mobile station in accordance with claim 13, wherein the first value is the nearest integer value less than the desired non-integer fractional slot cycle index value.

19. A mobile station in accordance with claim 13, wherein the second value is the nearest integer value greater than the desired non-integer fractional slot cycle index value.

20. A mobile station in accordance with claim 13, wherein the mobile station is a cellular radio telephone.

21. A base station comprising:
a transmitter for transmitting a paging signal; and
a controller including a scheduler, which is adapted for scheduling the transmission of a paging signal in a paging slot, responsive to a fractional slot cycle index value and any paging signal offset value associated with an intended mobile station recipient;
wherein the fractional slot cycle index includes a slot cycle index having a first integer value, which is less than the non-integer fractional slot cycle index value, during a period of time corresponding to a determined proportion of a reduced slot cycle period, and a second integer value, which is greater than the non-integer fractional slot cycle index value, during a period of time corresponding to a remaining portion of the reduced slot cycle period.

* * * * *